United States Patent [19]

Rossi

[11] Patent Number: 4,667,114
[45] Date of Patent: May 19, 1987

[54] PRIME MOVER SPEED SENSING SYSTEM AND METHOD

[75] Inventor: Anthony J. Rossi, Fitchburg, Mass.

[73] Assignee: General Electric Company, Schenectady, N.Y.

[21] Appl. No.: 852,483

[22] Filed: Apr. 16, 1986

[51] Int. Cl.$^4$ .......................... H02P 9/04; H02H 7/06
[52] U.S. Cl. ............................... 290/40 A; 290/40 R; 361/51; 361/236
[58] Field of Search ............. 290/40 A, 40 R; 361/51, 361/236, 239, 242

[56] References Cited

U.S. PATENT DOCUMENTS

| 4,217,617 | 8/1980 | Rossi et al. | 290/40 A X |
| 4,464,577 | 8/1984 | Wagner et al. | 290/40 A |
| 4,520,272 | 5/1985 | Danno et al. | 290/40 A |

Primary Examiner—William M. Shoop, Jr.
Assistant Examiner—Sharon D. Logan
Attorney, Agent, or Firm—Jerome C. Squillaro

[57] ABSTRACT

A method and apparatus for detecting a failure in the speed sensing system of a rotating shaft prime mover. The control system for the rotating shaft prime mover includes a speed sensing system for measuring the rotational speed of the shaft, a speed feedback system for providing actual rotational speed, and a monitoring system for monitoring the speed sensing system. The monitoring system detects loss of speed signal and overspeed conditions. The speed pickup sensing system includes at least a first, second and third speed sensor. The monitoring system senses with the speed pickup sensors the rotational speed of the shaft to provide signals representative thereof. It selects between the first and second speed signal the signal representative of the actual rotational shaft speed to produce a primary speed signal. The system compares the primary speed signal to the third speed signal for producing a speed feedback fault signal when the primary signal deviates from the third signal by a predetermined value. Each of the speed signals are compared with each other for generating a speed pickup fault signal when any one of the speed signals deviates from another by a predetermined value. The primary signal is compared to a predetermined value for detecting an overspeed condition in the prime mover. An overspeed condition or a primary signal fault indication trips the prime mover. A loss of speed signal causes an indication to be displayed for the operator of the prime mover.

25 Claims, 7 Drawing Figures

| SPEED | SOURCE | COMPARED WITH | FAULT INDICATION | TURBINE CONDITION AFTER FAULT |
|---|---|---|---|---|
| 1 | SPEED PICKUP | REFERENCE | PICKUP | RUNNING |
| 2 | SPEED PICKUP | REFERENCE | PICKUP | RUNNING |
| 3 | SPEED PICKUP | PRIMARY | PICKUP | RUNNING |
| PRIMARY | 1 OR 2 | REFERENCE | LOSS OF SPEED FEEDBACK | SHUT DOWN |
| REFERENCE | 3 | PRIMARY | PICKUP | RUNNING |
| PRIMARY | 1 OR 2 | PREDETERMINED LEVEL | OVERSPEED | SHUT DOWN |
| SPEED FEEDBACK | PRIMARY | REFERENCE | LOSS OF SPEED FEEDBACK | SHUTDOWN |

FIG. 2

PRIME MOVER SPEED SENSING SYSTEM AND METHOD

BACKGROUND OF THE INVENTION

1. Field of the Invention

The invention relates, in general, to a speed control system for a rotating shaft prime mover, and in particular, relates to a speed sensing system and method for detecting a failure in the speed sensing circuit.

2. Background Discussion

Prime movers operate under the control of large inline fluid control valves which regulate the flow of motive fluid into the prime mover. These fluid control valves may include a stop valve and a control valve positioned in series in a steam header upstream from the turbine. The control valve may be set to any intermediate postion between full open and full closed, whereas the stop valve is usually either full open or full closed.

In this type of system, the control of a turbomachine is well suited for a feedback control system which measures the rotating shaft speed. In a turbomachine, electronic speed control is provided for both normal operating conditions and for overspeed protection. Under normal operating conditions turbine control valves are positioned in accordance with a comparison between a desired speed and actual speed. A range of control is maintained from 1%–100% of rated speed. In response to a valve position change command, the turbine valve is adjusted to a more open or more closed position.

An overspeed control relates to overspeed conditions which pertains to speeds in excess of the rated speed. When the rated speed is exceeded, the overspeed control causes the turbine to trip (shutdown) based on the rapid shutting down of motive fluid to the turbine. Overspeed protection is usually provided in the form of a solenoid valve between the source of the motive fluid and the turbine. The solenoid valve is normally full open during normal operating conditions or fully close in response to a signal from the overspeed control circuit.

A loss of signal control relates to a loss of signal in the speed control for normal operating conditions and overspeed conditions. A failure in any of the speed pickup sensors or the associated speed sensing circuitry could cause a false overspeed condition. A speed monitoring system for monitoring the sensors and sensing circuitry must notify the operator of a sensor signal failure, detect the nature of the failure, and if possible allow the turbine to continue operating. It is this type of speed control to which this invention is directed.

Some turbines are used in support of operations such as boiler feed pump turbines, industrial drive turbines, and plant process turbines. The underlying common concern regarding these types of support turbines is that a shutdown of the turbine due to an overspeed condition or turbine control failure may cause a train of shutdown events which can be catastrophic. Therefore, it is desirable to trip the turbine machine when a true overspeed condition arises, and not to trip the turbine machine unless an overspeed condition actually exists.

Numerous examples relating to speed protective circuits of a prime mover are available in the prior art including U.S. Pat. Nos. 4,464,577 and 4,217,617. Briefly, a plurality of redundant speed pickup sensors provide a primary speed signal. The speed signals are input into one of three identical speed translators which provide a loss of signal output. The loss of signal output is generated whenever the actual speed signal falls below some low threshold value. A problem with this type of circuitry is that the loss of signal is only detected upon the failure of a speed pickup sensor. If the loss of signal occurs further within the circuitry, there is no indication of a loss of signal. If a loss of signal does occur further within the circuitry, a false overspeed condition may arise with disasterous results causing a shutdown to the turbine which can be very costly to the turbine owner.

At startup, the speed pickup sensors measure a zero speed which may trigger the overspeed protection circuitry. When a turbine is started, time delay circuitry is used to defeat the overspeed protection circuitry. When the time delay circuit times out, it activates the overspeed protection circuitry. A problem with the time delay circuit is that the turbine may have different loads at startup. This causes the turbine to reach normal operating speeds at different times which can not be accurately predicted. If the time delay is too short, the overspeed protection may trip too early causing an inability to start the turbine machine. If the time delay is too long, the turbine machine may reach operating speed with no overspeed protection while the time delay circuitry is active.

Therefore, it is an object of the present invention by providing a speed sensing system that eliminates the previous shortcomings of the startup time delay circuit.

It is another object of the present invention to provide a more reliable loss of speed sensing circuitry than has been heretofore available to turbine owners.

It is yet another object to provide a means and method for determining the loss of speed signal in one speed pickup sensor and automatically switching to another speed pickup sensor while continuing to provide loss of speed protection.

It is a further object to provide redundant speed sensing circuitry in order to avoid unnecessary turbine shutdown.

It is another object of the present invention to provide loss of speed protection in the entire speed pickup sensing system.

SUMMARY OF THE INVENTION

The present invention relates to a speed sensing control system for a rotating shaft prime mover capable of operating in a speed feedback control loop. The speed sensing system has a speed pickup sensing system for providing actual rotational shaft speed and a speed feedback monitoring system for detecting a loss of speed signal and overspeed condition in the system. The speed pickup sensing system includes three speed pickup sensors for providing a first, second, and third speed signal. The first and second signals are applied to inputs of a high value gating means. The high value gating means selects the highest level signal available from the first and second signals for producing a primary speed signal. The third speed signal is a reference signal. The primary signal is compared to the reference signal in a speed feedback detector for determining a loss of speed feedback signal. Also, the primary signal is fed to an overspeed detector for detecting an overspeed condition in the turbine. The output from the overspeed detector and speed feedback detector are applied to the inputs of a speed feedback and overspeed fault indicating means. If an overspeed condition or loss of speed feedback signal is detected the turbine is shutdown.

The reference signal is compared to the signals from the first and second speed pickup sensors for detecting a loss of signal in any one of the speed pickup sensors. The reference signal is also compared to the primary signal for detecting a loss of reference signal. The loss of signal in any one of the three speed pickup sensors is fed to a speed pickup fault indicating means. The speed pickup fault means trigger a display for notifying the turbine operator.

The comparing means include an operational amplifier having one signal applied to the noninverting input for comparing against a second signal applied to the inverting input. A bias circuit connected to the inverting input provides a high level output voltage when both signals are the same level and a low level output whenever the signal to the noninverting input falls below a predetermined level. The low level triggers one of the fault indicating means for providing a loss of speed pickup signal, loss of speed feedback signal, or overspeed detection.

BRIEF DESCRIPTION OF THE DRAWINGS

Those and other objects and advantages of the present invention will become more apparent by referring to the following detailed description and accompany drawings in which:

FIG. 2 is a table showing the source of speed signal, the comparison speed signal, the fault indication, and subsequent condition of the turbine.

DETAILED DESCRIPTION OF THE INVENTION

While the present invention will be described hereinafter with particular reference to the accompanied drawings, in which certain operating embodiments of the method of the present invention are shown, it is to be understood at the outset of the description which follows that it is contemplated that the apparatus or method in accordance with the present invention may be varied from the specific forms described hereinafter, while still obtaining the desired results of this invention. Accordingly, the description which follows is to be understood is a broad teaching disclosure directed to persons of appropriate skill in the appropriate arts, and not as limiting upon the scope of this invention.

1. General Description

Figure 1:
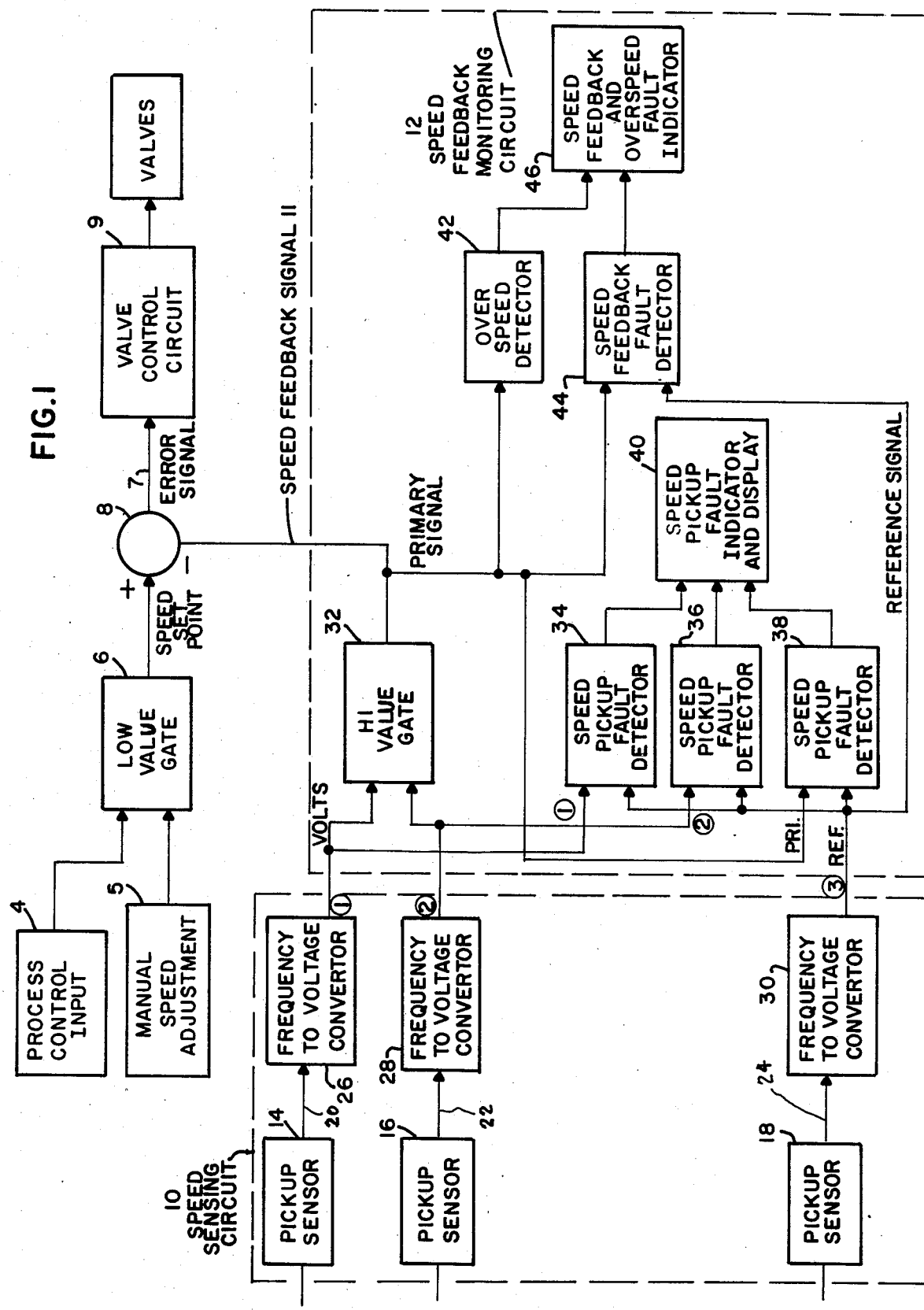
FIG. 1 is a block diagram of a prime mover speed control system in accordance with the present invention.

FIG. 1 shows a block diagram of a speed control system for a prime mover. The control of the valves is provided by a speed control feedback system. A process control input 4 provides a signal representative of a load which may be electrical, mechanical or indicative of a process flow or process pressure. The process control input 4 provides a signal which is applied to one input of a low value gate 6. A manual speed adjustment 5 enables the turbine operator to input operational commands such as speed set point or load set point into the control system. The signal from the manual speed adjustment input 5 is applied to another input of the low value gate 6. The low value gate 6 selects the lowest speed set point for the operation of the turbine. The speed set point signal from the low value gate 6 is input into a summing junction 8 for comparison with a speed feedback signal 11. The speed feedback signal 11 compared with the speed set point signal produces a valve position signal 7 which is applied as an input to the valve control circuit 9. The valve control circuit 9 controls the opening and closing of the valves of the turbine, in a manner well known to those of ordinary skill in the art.

A speed pickup sensing circuit 10 provides three speed signals 1, 2 and 3 representative of the actual speed conditions of the turbine. The speed signals are applied as inputs to the speed feedback monitoring circuit 12 which monitors the loss of signals for each speed pickup sensor circuit, loss of speed feedback signal 11, and overspeed detecton. Speed signals 1 and 2 produce a primary signal and speed signal 3 is the reference signal.

The speed pickup sensing circuit 10 comprises speed pickups sensors 14, 16, and 18 adjacent to prime mover or turbo machine shaft (not shown). The speed pickups generate a pulse train signal 20, 22 and 24 which are fed to frequency-to-voltage convertors 26, 28 or 30, respectively. The output of each frequency-to-voltage convertor generates a voltage level corresponding to shaft speed.

The speed feedback monitoring circuit 12 includes a high value gate 32, speed pickup fault detectors 34, 36 and 38, a speed pickup fault indicator and display 40, an overspeed detector 42, a speed feedback fault detector 44, and a speed feedback and overspeed fault indicator 46.

The speed signals 1 and 2 are applied as inputs to the high value gate 32. The high value gate 32 selects the highest signal from either of speed signals 1 or 2 for producing a primary signal. For a better understanding of the configuration and detail description of the components of the high value gate 32 attention is directed to FIG. 3 of the drawings wherein the high value gate 32 is illustrated in detail.

The high value gate 32 provides a primary signal even with a failure in either speed signal 1 or 2. The primary signal is the speed feedback signal 11 applied to the summing junction 8 for producing the valve position signal 7. The primary signal is also applied to the inputs of the eoverspeed detector 42, the speed feedback fault detector 44, and the speed pickup fault detector 38. An overspeed condition in the primary signal is detected by the overspeed detector 42 which triggers an overspeed trip fault in the speed feedback and overspeed fault indicator 46. A failure in the primary signal is detected by fault detector 44 which triggers a loss of speed feedback trip fault in the speed feedback and overspeed fault indicator 44. It is important to note that a failure in any component of the circuitry from the speed pickup sensor to the frequency-to-voltage convertor through the high value gate is detected by the speed feedback fault detector 44.

Assuming that either one of speed signals 1 or 2 is normal, the primary signal from the high value gate 32 reflects the actual rotating speed of the turbine. The primary signal fed to the speed feedback fault detector is compared to speed signal 3, hereinafter referred to as the reference signal. Under normal operating conditions, the inputs to the speed feedback fault detector are the same. However, if there is a failure in the high value gate 32 or in the circuitry of speed signals 1 and 2 the primary and reference signal are unequal. The speed feedback fault detector 44 detects any deviation between the primary and reference signal and outputs an indication to the speed feedback fault indicator 46.

The primary signal is also fed to the speed pickup fault detector 38. The speed pickup fault detector 38 compares the primary signal from the high value gate 32 to the reference signal. A failure in the reference signal, such as a speed pickup 18 failure or a frequency to voltage converter 30 failure, is detected by the speed pickup fault detector 38. Upon detecting a failure, the fault detector 38 outputs a loss of speed signal to the speed pickup sensor fault indicator and display 40.

Speed signals 1 and 2 are compared to the reference signal by speed pickup fault detector 34 and speed pickup fault detector 36 respectively. A speed pickup 14 failure or a frequency-to-voltage convertor 26 failure is detected by speed pickup fault detector 34 which produces a fault indication detected by speed pickup failt indicator 40. Similarly, a speed pickup 16 failure or a frequency-to-voltage convertor 28 failure is detected by speed pickup fault detector 36 which produces a fault indication detected by speed pickup fault indicator 40.

2. Operational Description

FIG. 2 is a table showing turbine states upon a loss of speed signal or overspeed condition. The signal column represents the different speed signals available. The source column represents the source for the signal. For example, the primary signal is produced from either speed signal 1 or 2. The "compared to" column represents which signal is compared to the speed signal to generate a fault indication. The turbine condition column represents the condition of the turbine after the fault indication. For instance, a loss of signal 1 allows the turbine to continue running. However, a loss of the primary signal results in a turbine shutdown.

Under normal opeating conditions, all speed signals are equal. Assuming the reference signal is operating properly, a speed pickup fault indicator displays a loss of signal upon failure of a component in speed signals 1 or 2. For example, in speed signal 2, if a failure has occurred in the circuitry of speed pickup 16, the loss of signal is generated by the speed pickup fault detector 36 and indicated on the speed pickup fault indicator 40. A loss of speed pickup 16 does not shutdown the turbo machine because the high value gate 32 selects signal 1 from speed pickup 14 as the primary signal. Similarly, for speed signal 1, a failure in speed pickup 14 circuitry causes a speed pickup 14 fault indication. However, if speed pickup 16 circuitry is operating properly, the primary signal is generated from speed pickup 16.

The reference signal is compared to the primary signal for detecting a loss of reference signal. A loss of the reference signal generates a fault indication in the speed pickup fault indicator 40. However, a failure in the reference signal does not trigger an output signal from the speed feedback fault detector 44 because the speed feedback signal is still provided by the primary signal. A loss of primary signal results in a loss of speed feedback signal which trips the turbine.

The overspeed detector 42 compares the primary signal to a predetermined level (usually 110% of rated speed), for detecting an overspeed condition. If an overspeed condition exists, the overspeed detector triggers the overspeed indicator 46 which trips the turbine. Note that the three conditions that require a shutdown of the turbine are a loss of the primary signal, an overspeed condition, or a loss of speed feedback signal. For all other faults, the turbine remains running.

The speed sensing system eliminates the time delay circuit of previous speed control systems. The speed feedback monitoring circuit senses for a true overspeed condition by comparing the primary signal to a predetermined level (110% of rated RPM). Since each speed signal is compared to at least one other speed signal, the speed monitoring system detects speeds from 1% to 100% of rated RPM. Since the time delay circuit can be eliminated the system provides protection from startup (1%) to normal operating speeds.

3. High Value Gate

Figure 3:
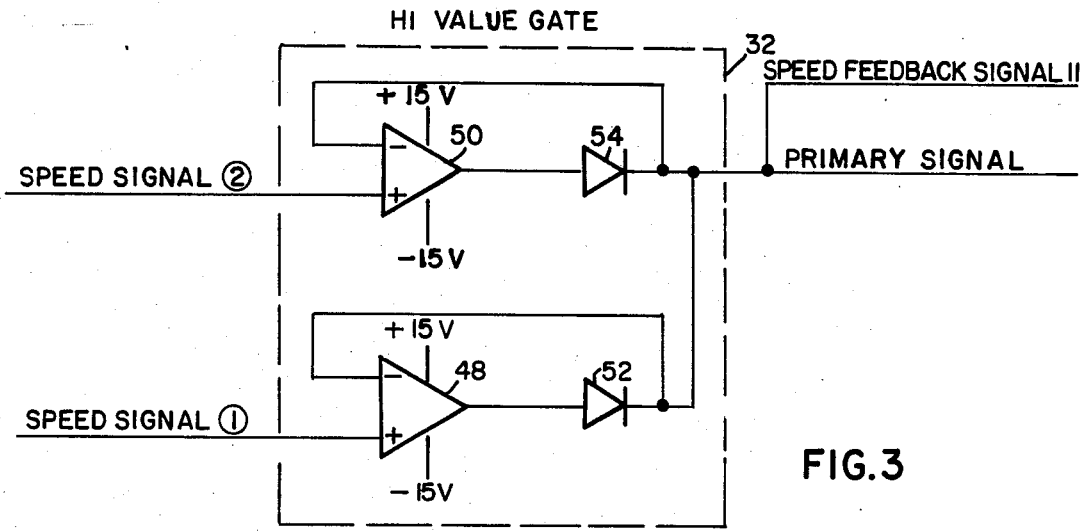
FIG. 3 is a detailed circuit diagram of the high value gate.

Referring to FIG. 3 there is shown a detail circuit diagram of the high value gate 32. The speed signals 1 and 2 are applied to the noninverting input terminals of unity gain follower amplifiers 48 and 40, respectively. The output terminals of amplifiers 48 and 50 are connected in parallel to produce the primary signal. If the input to amplifiers 48 and 50 are the same, the output is equal to the inputs. In the event of a loss of one input, the primary signal equals the input of the other amplifier. Diodes 52 and 54 prevent current from flowing back through the amplifier upon a signal loss on the noninverting input of the amplifier. In operation, signals 1 and/or 2 produce the primary signal. If a loss of signal 1 occurs the primary signal is produced by speed signal 2. A loss of speed signal 2 results in the primary signal produced by speed signal 1. In normal operations, speed signal 1 and speed signal 2 are equal, this causes the primary signal to be equal to either speed signal. The primary signal is fed to the speed pickup fault detector 38, the overspeed detector 42, the summing junction 8 and the speed feedback fault detector 44. The primary signal fed to summing junction 8 is the speed feedback signal 11.

4. Speed Pickup Fault Detector

Figure 4:
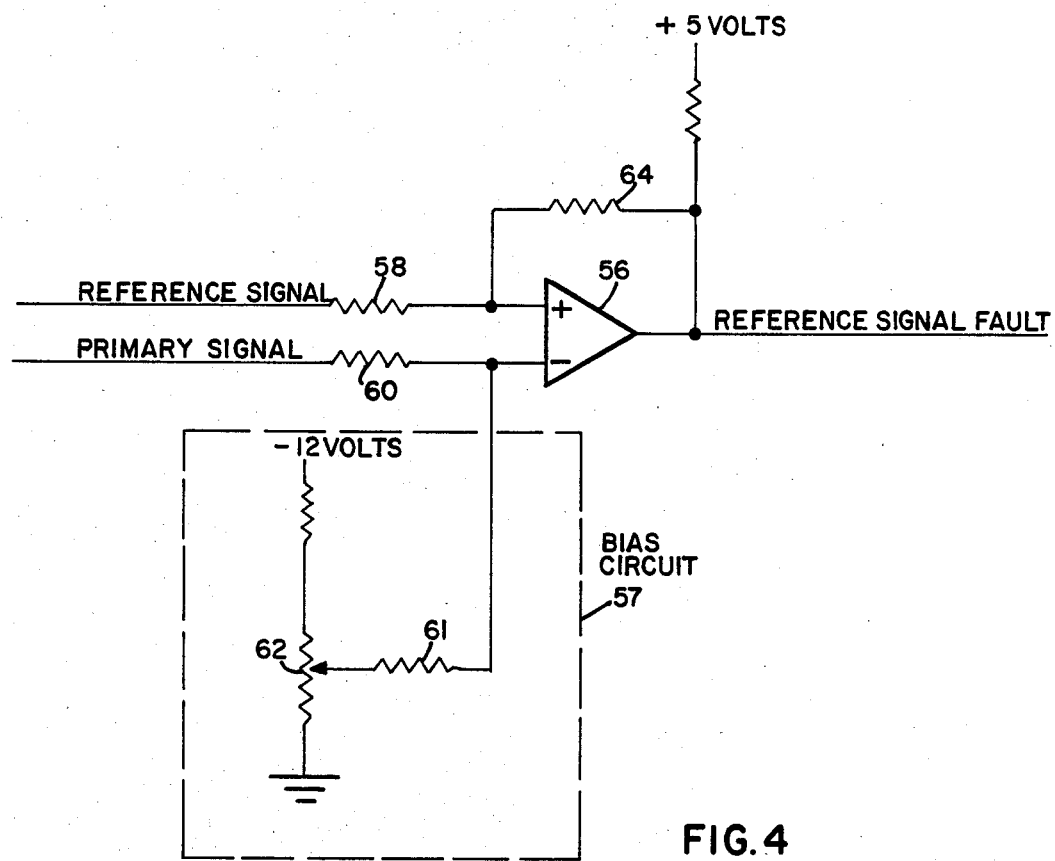
FIG. 4 is a detailed circuit diagram of a speed sensor fault detector.

FIG. 4 shows a detailed circuit diagram of a speed pickup fault detector 38. The speed pickup fault detector 38 includes an operational amplifier 56 and bias circuit 57. Each shaft speed pickup sensor has a fault detector associated with it to detect failure in the speed pickup sensor circuitry. For example, the speed pickup fault detector 36 detects a failure in the circuitry of the shaft speed pickup sensor 16. The speed pickup fault detector circuitry is identical for each speed pickup fault detector and the operation of each is similar. For brevity, only the speed pickup fault detector 38 is explained in detail.

The primary signal is applied to a summing junction at an inverting input terminal of amplifer 56 through a resistor 60. The reference signal is applied to the noninverting input terminal of amplifier 56, through a resistor 58. The resistor 58 and a feedback resistor 64 connected between the output and noninverting input terminals set the gain of amplifier 56. A bias circuit 57 connected to the inverting input terminal of amplifier 56 includes a −12 volt supply and a voltage divider network. A potentiometer 62 is adjusted to provide a negative voltage offset to the inverting input terminal of amplifier 56 through a resistor 61. The value of the negative voltage corresponds to 1% of the output voltage of the frequency to voltage converter at rated turbine speed.

In normal operation, since the primary signal and reference signal are equal, the negative bias voltage at the inverting input results in amplifier 56 having a logical 1 output, which may be, for example, at a voltage of approximately five volts. In the event that the speed sensing circuitry of the reference signal fails, the greater voltage at the inverting input of amplifier 56 causes the amplifier 56 to switch from a positive five volt output to approximately zero volts. This results in the input to the speed pickup fault indicator 40 to have a logic 0 signal. Thus, a failure in the circuitry of the reference signal results in a change of the logic level on the output of amplifier 56 from a high level (logic 1) to a low level (logic 0). In this particular embodiment, the signal being tested with this circuitry is applied to the noninverting input of the amplifer. The loss of signal upon the noninverting input causes the transition in logic levels on the output.

Speed signals 1 and 2 are tested against the reference signal in the same manner. The reference signal is fed to an inverting input terminal of amplifiers in the speed pickup fault detectors 34 and 36. The noninverting input for fault detector 34 is speed signal 1 and the noninverting input for fault detector 36 is speed signal 2. A failure in the circuitry of speed signal 1 triggers the speed pickup fault indictor 40. Similarly, a failure in the circuitry of speed signal 2 triggers the speed pickup fault indicator 40. The failure is detected as described in reference to FIG. 4.

The bias circuit can be adjusted to provide any offset voltage from −12 volts to ground. On turbine startup, the speed signals are at zero volts. The negative voltage offset corresponds to a speed signal voltage of 1% of rated RPM. Thus, fault detection is from 1% to 100% of rated RPM. If a lower percent of rated RPM is necessary the offset voltage can be adjusted accordingly.

5. Speed Pickup Fault Indicator

Figure 5:
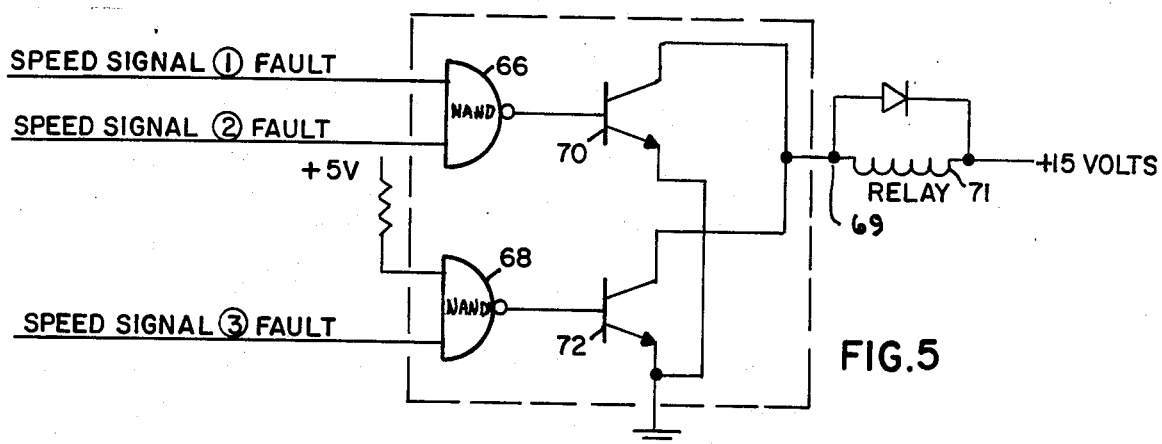
FIG. 5 is a detailed circuit diagram of the speed sensor fault indicator.

Referring to FIG. 5, there is shown a detailed circuit diagram of the speed pickup fault indicator 40. The speed pickup fault indicator 40 receives the outputs from the speed pickup fault detectors 34, 36 and 38. The fault indicator 40 includes NAND gates 66 and 68 connected to transistors 70 and 72 respectively. The output from the speed pickup fault detector 34 is applied to one input terminal of NAND gate 66. The other input terminal of NAND gate 66 receives the output from speed pickup fault detector 36. The NAND gate 68 receives the output from speed pickup fault detector 38 while the other input terminal is connected to a high level (logic 1). Under normal operations, with all speed pickup sensors operating properly a high level is applied to the inputs of NAND gates 66 and 68. If a failure is detected in any speed pickup sensor or associated circuitry, a low level is applied to one of the input terminals of NAND gate 66 or 68. A switching of the levels on the input terminals of NAND gate 66 or 68 results in either transistor 70 or 72 energizing a relay 71 and providing an indication of a speed pickup sensor circuit failure. For example, a low level applied to one of the terminals of NAND gate 66 triggers transistor 70. Transistor 70 connects output terminal 69 to ground causing a current to flow through relay 71 for activating relay 71. The relay 71 is connected to further circuitry for providing an indication to the operator of a failure in the speed sensing circuitry. This may include a light display or an audible alarm.

6. Speed Feedback Fault Detector

Figure 6:
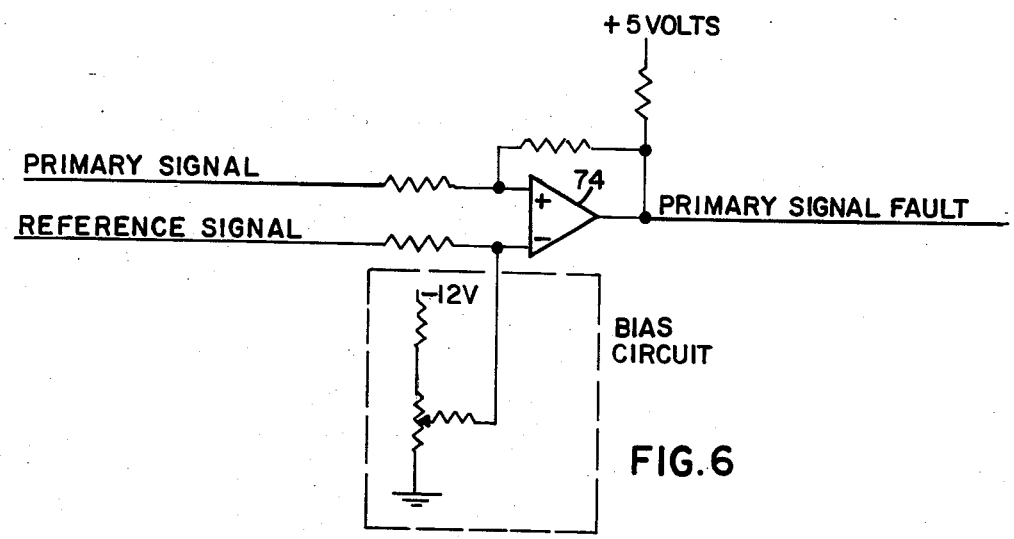
FIG. 6 is a detailed circuit diagram of the speed feedback fault detector.

Referring to FIG. 6 there is shown a detailed circuit diagram of the speed feedback fault detector 44. This circuitry operates similarly to that as described in FIG. 4. The important feature is that the primary signal from either speed sensor 1 or speed sensor 2 is applied to the noninverting input terminal of amplifier 74. The reference signal is applied to the inverting input terminal. If a failure is detected in the primary signal (speed feedback signal) the output of amplifier 74 switches from a high level to a low level. The output of amplifier 74 is applied to an input of the speed feedback fault indicator 46. The speed feedback fault indicator 46 comprises the same circuitry as that described in FIG. 5. The inputs to the speed feedback fault indicator are then connected to the output of the speed feedback fault detector and the overspeed detector. The speed feedback fault signal is applied to one input terminal of a NAND gate of the speed feedback fault indicator, the second input terminal of the NAND gate is at a high level (logic 1). The output from the overspeed detector is applied to one input of the second NAND gate with, the second input terminal of the NAND gate at a high level (logic 1). In the same manner as the speed feedback fault indicator, a change of level states on any of the inputs causes a relay to trip to indicate a loss of a speed feedback signal or an overspeed detection. This relay also trips the turbine when this is a failure in the primary signal or an overspeed detection.

7. Overspeed Detecor

Figure 7:
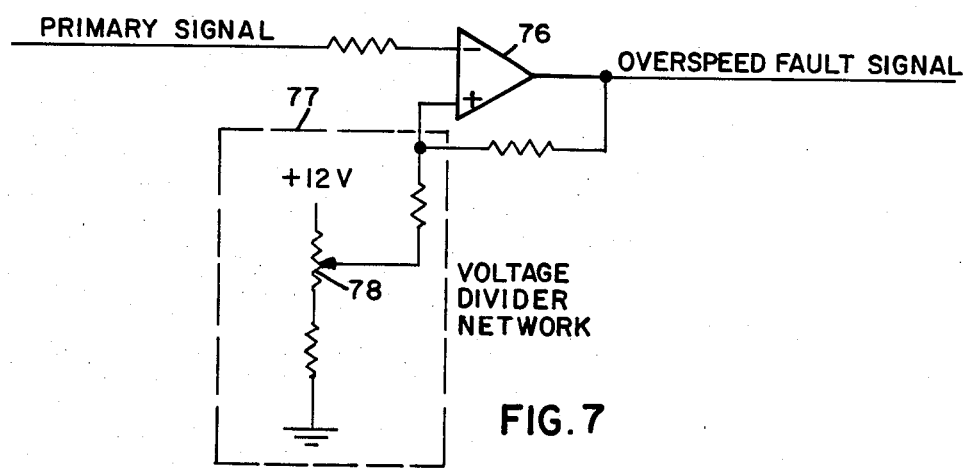
FIG. 7 is a detailed circuit diagram of the overspeed detector.

The overspeed detector 42 generates an overspeed detection signal to the speeed feedback fault indicator 46. The circuitry of the overspeed detector is shown in FIG. 7. The overspeed detector 42 comprises an amplifier 76 with a predetermined voltage level applied to the noninverting input. A potentiometer 78 adjusts the voltage level at the noninverting input through a resistor divider network. The primary signal is applied to the inverting input terminal of amplifer 76. The output of amplifer 76 is adjusted by the potentiometer 78 of voltage divider network 77 to provide a high level output for normal speeds of the turbine. If an overspeed condition (110% of rated RPM) exists in the primary signal the output of amplifier 765 switches to a low level. The output from the amplifier 76 is fed to speed feedback fault indicator 46 which trips a relay to shutdown the turbine.

8. Conclusion

A shaft speed pickup sensor failure circuitry is shown which detects the failure in the speed circuitry to the point where the speed error signal is produced. In the event, that any shaft speed pickup sensor circuitry fails, the speed feedback monitoring circuit indicates a failure on the speed pickup fault indicator. A critical failure of the speed feedback signal or overspeed detection results in a trip signal to shutdown the turbine. The circuitry is designed so that a single failure in a speed sensor does not cause shutdown in the turbine. The turbine continues to operate as long as the primary speed signal is available.

In addition to monitoring the speed sensing circuitry, this circuitry eliminates any time delay circuitry for deactivating the monitoring circuits on startup of the turbine. The circuitry of the present invention operates from startup speed to normal operating speeds.

While there has been shown and described what is at present considered to be the preferred embodiment of the present invention, modifications thereto will readily occur to those skilled in the art. It is not desired, therefore, that the invention be limited to the specific method and logic structure shown and described and it is intended to cover in the appended claims all such modifications as fall within the true spirit and scope of the invention.

What is claimed is:

1. In a control system for a rotating shaft prime mover capable of operating in a speed feedback loop configuration having a speed sensing system, a monitoring circuit for detecting a failure in the speed sensing system comprising:

first, second and third speed pickup sensors for monitoring shaft rotational speed, each sensor producing a corresponding first, second and third sensor signal representative thereof;

means for converting each sensor signal for producing a first, second, and third speed signal corresponding to a shaft speed;

gating means for selecting from the first and second speed signals a primary signal representative of the actual rotational speed of the shaft;

means for detecting a failure in the primary signal including a first operational amplifier having the primary signal applied to the noninverting input terminal and the third signal applied to the inverting input terminal whereupon the output of said first amplifier goes low if the primary signal deviates from the third signal;

means for detecting a failure in the speed signals;

means for detecting an overspeed condition in the prime mover from said speed signals.

2. The system of claim 1, wherein means for detecting a failure in the speed signals includes a means for comparing at least one speed signal to at least one other speed signal for producing a speed pickup fault signal when one of the speed signals deviates from the other;

a means for activating a relay upon a speed pickup fault signal, whereby a fault display signal is initiated.

3. The system of claim 2 where said comparing means includes a second operational amplifier having at least one speed signal applied to the noninverting input terminal and another speed signal applied to the inverting input terminal whereupon the output of the amplifier goes low if the noninverting input deviates from the inverting input.

4. The system as in claims 1 or 3, further comprising a bias circuit applied to the inverting input terminal of said amplifier whereupon the output of said amplifier remains high if the inputs are equal and the output goes low if the inputs deviate.

5. The system of claim 1, wherein said output of said first amplifier and means for detecting an overspeed condition are connected to a relay control means whereby said relay control means trips the prime mover upon an overspeed condition or loss of primary signal.

6. In a control system for a rotating shaft prime mover having a speed sensing system for measuring the rotational speed of the shaft, a monitoring circuit for detecting a failure in the speed sensing system comprising:

(a) multiple shaft speed sensors for measuring the shaft rotational speed, including at least a first, second and third speed sensor each producing signals representative thereof;

(b) means for selecting between said first speed signal and said second speed signal a primary signal; and (c) means for comparing said primary signal with said third signal for producing a primary fault indication signal when said primary signal deviates from said third signal by a predetermined value.

7. The system as in claim 6, further comprising:

(d) means for comparing each of said speed signals with all other of said speed signals to provide a sensor fault indication signal when any one of the signals deviates from another by a predetermined value.

8. The system as in claims 7, further comprising:

(e) means for comparing said third speed signal with said primary signal for providing a sensor fault indication signal when said third signal deviates from said primary signal by a predetermined value.

9. The system as in claims 6, 7, or 8 wherein said comparing means includes:

(f) comparison means having one signal applied to a first input terminal and the other signal applied to a second input terminal;

(g) a bias circuit connected to one of said input terminals for providing a signal of first logical significance when both input signals are of the same value and a signal of second logical significance when one of the signals deviates from the other by a predetermined value.

10. The system as in claim 9, wherein a signal to be tested is applied to the first input terminal and a reference signal is applied to the second input terminal.

11. The system as in claim 10, wherein said comparing means is an operational amplifier and said bias circuit is connected to the second input terminal for providing a logic one when both inputs are of the same value and a logic zero when the first input terminal falls below a predetermined value.

12. The system of claim 6, further comprising a means for converting the sensor signals to a value corresponding to shaft speed.

13. The system of claim 12 wherein said converting means includes a frequency to voltage convertor for receiving a variable pulse train signal from a speed sensor for converting said pulse train to a voltage level.

14. The system of claim 8 further including a sensor fault indicator means for receiving said sensor fault indication signal for producing a signal whereby an operator may be notified by the sensor fault indication signal.

15. The system of claim 6 further comprising a means for comparing the primary signal to a predetermined level for producing an overspeed fault indication signal when the primary signal deviates from a predetermined value.

16. The system of claim 15 further comprising a fault indicator means for receiving primary signal fault indication and a primary fault indication signal to produce a signal for tripping a control relay whereby a trip in the prime mover may be initiated by said fault indicator means.

17. In a control system for a rotating shaft prime mover having a speed sensing system for measuring the rotational speed of the shaft, a speed feedback system for providing actual rotational speed and a monitoring system for monitoring speed sensing system, the speed sensing system including at least a first, second, and third speed sensor, a method for detecting a failure in the speed sensing system comprising the steps of:

(a) sensing with the speed sensors the rotational speed of the shaft to provide signals representative thereof;

(b) selecting between the first and second speed signal the signal representative of the actual rotational shaft speed to produce a primary speed signal;

(c) comparing the primary speed signal to the third speed signal to produce a speed feedback fault signal when the primary signal deviates from the third signal by a predetermined value.

18. The method of claim 17, further comprising the steps of:
(d) comparing each of the speed signals with all other of the speed signals;
(e) generating a sensor fault signal when any one of the speed signals deviates from another by a predetermined value.

19. The method of claim 18, further comprising the steps of:
(f) comparing the third signal with the primary signal;
(g) producing a sensor fault signal when the third speed signal deviates from the primary signal by a predetermined value.

20. The method of claim 18, further comprising the steps of:
(h) comparing the first speed signal to the third speed signal;
(i) generating a sensor fault signal when the first speed signal deviates from the third speed signal by a predetermined value.

21. The method of claim 18, further comprising the steps of:
(j) comparing the second speed signal to the third speed signal;
(k) generating a sensor fault signal when the second signal deviates from the third speed signal by a predetermined value.

22. The method of claim 17, further comprising the step of detecting an overspeed condition in the prime mover from the primary signal.

23. The method of claim 22, further comprising the steps of:
(l) comparing the primary signal to a predetermined value;
(m) producing an overspeed fault signal when the primary signal deviates from the predetermined value.

24. The method of claims 17 or 23, further comprising the steps of:
(n) tripping the prime mover upon a feedback or overspeed fault signal.

25. The method of claim 21, further comprising the step of:
(o) displaying the results of the sensor fault signal whereby an operator may be notified of the failure of a speed sensor.

* * * * *